A. SCHRADER.
Cultivator.
No. 166,636.
Patented Aug. 10, 1875.
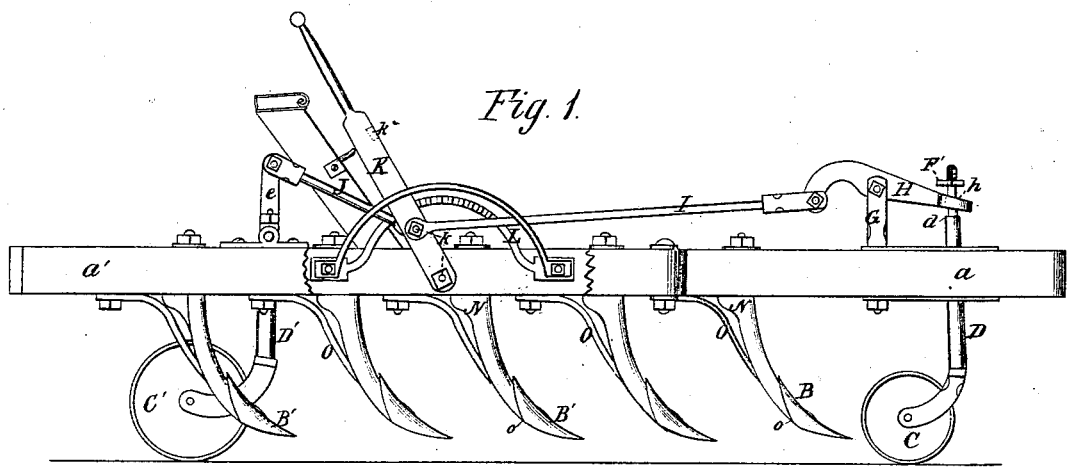
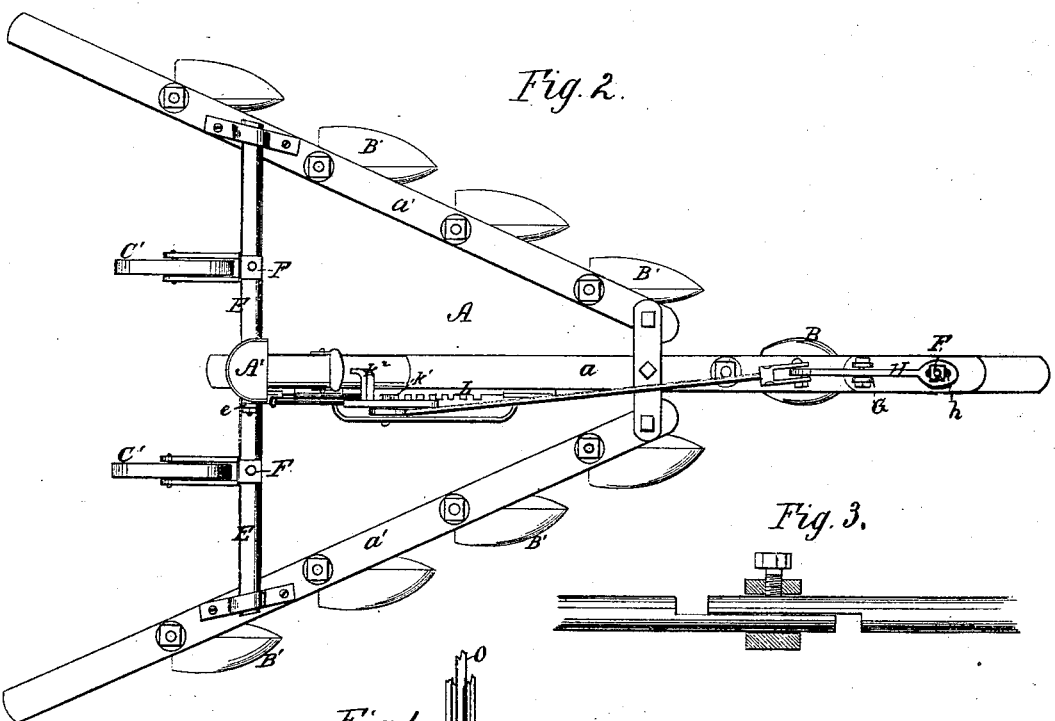
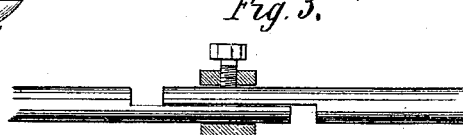
WITNESSES:
W. W. Hollingsworth
Solon C. Kemon
INVENTOR:
A. Schrader
BY
ATTORNEYS.
N. PETERS, PHOTO-LITHOGRAPHER, WASHINGTON, D. C.

UNITED STATES PATENT OFFICE.

ANDER SCHRADER, OF WALLA WALLA, WASHINGTON TERRITORY.

IMPROVEMENT IN CULTIVATORS.

Specification forming part of Letters Patent No. 166,636, dated August 10, 1875; application filed June 7, 1875.

*To all whom it may concern:*

Be it known that I, ANDER SCHRADER, of the city and county of Walla Walla, Washington Territory, have invented a new and Improved Gang-Plow; and I do hereby declare that the following is a full, clear, and exact description of the same, reference being had to the accompanying drawing, forming a part of this specification, in which—

Figure 1 is a side elevation, with one wing broken out; Fig. 2, a plan view; Fig. 3, a detail of sliding joint; Fig. 4, a rear view of shovel, standard, and brace.

The invention relates to that class of gang-plows whose frame is supported on swiveled caster-wheels, so as to regulate the depth of their furrows.

The invention consists in novel means whereby the front and rear wheels may be simultaneously graduated by the hand of driver so as to run the plows at any depth required.

A represents a wing-frame, consisting of main beam $a$, and at an acute angle thereto, on each side, the lateral beams $a'$ $a'$, the former being provided with the front plow B as well as seat A′, and the latter with a series of plows B′, arranged in an oblique line to beam $a$. C is the front caster-wheel, arranged in a bifurcation of swiveled vertical rod or bar D, while C′ C′ are the rear wheels whose rods D′ D′ are swiveled in the same rock-shaft E, all being secured at the top by a suitable nut, F. On the opposite side of shaft E is an arm, $e$, and on a post, G, is fulcrumed a lever, H, whose front end has an oblong slot, $h$, and is secured loosely between the nut F′ and shoulder $d$. The rear end of lever H and upper end of arm $e$ are connected by two rods, I J, jointed to a vertical lever, K, which is fulcrumed at $k$, and may have a side lip, $k^1$, that fits any one of several teeth of ratchet L. This lever may also, if desired, be provided with a foot-rest, $k^2$, so that the lever may be operated either by hand or foot. Thus, if the lever is pressed in a forward direction, the front wheel will be lifted, while the rear ones will move upward in the arc of a circle, the wheels being proportionally elevated. The reversible plows B B′ are connected by bolt or rivet with the foot $n$ of standard N, and with rear brace O having the foot $o$ and lying in the rear groove $n$ of standard. This forms a very strong fastening for the plow, and one that retains it securely in any position to which it may be adjusted.

Having thus described my invention, what I claim as new, is—

The combination, with sliding rod D and swiveled rods D′, holding front and rear wheels, of the rock-shaft E having arm $e$, the lever H having oblong slot $h$, the rods I J, and the lever K, all arranged in connection with frame A, as and for the purpose described.

Signed at Walla Walla this 8th day of March, 1875.

ANDER SCHRADER.

Witnesses:
CHARLES ROBERT BERTRAM,
A. E. ISHAM.